July 23, 1968 P. R. HELM ET AL 3,393,758
APPARATUS FOR STABILIZING A CRAWLER CRANE
Original Filed Sept. 30, 1963 4 Sheets-Sheet 2
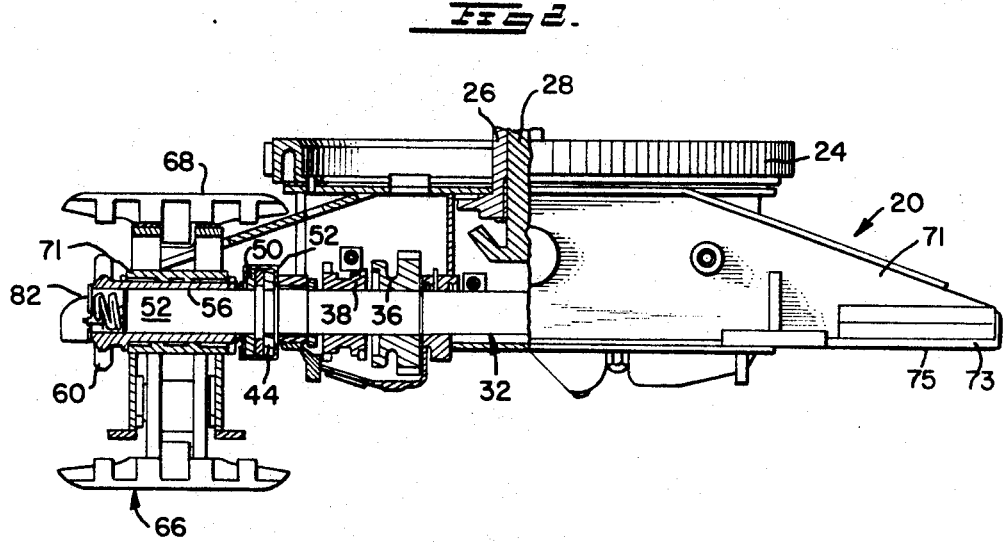
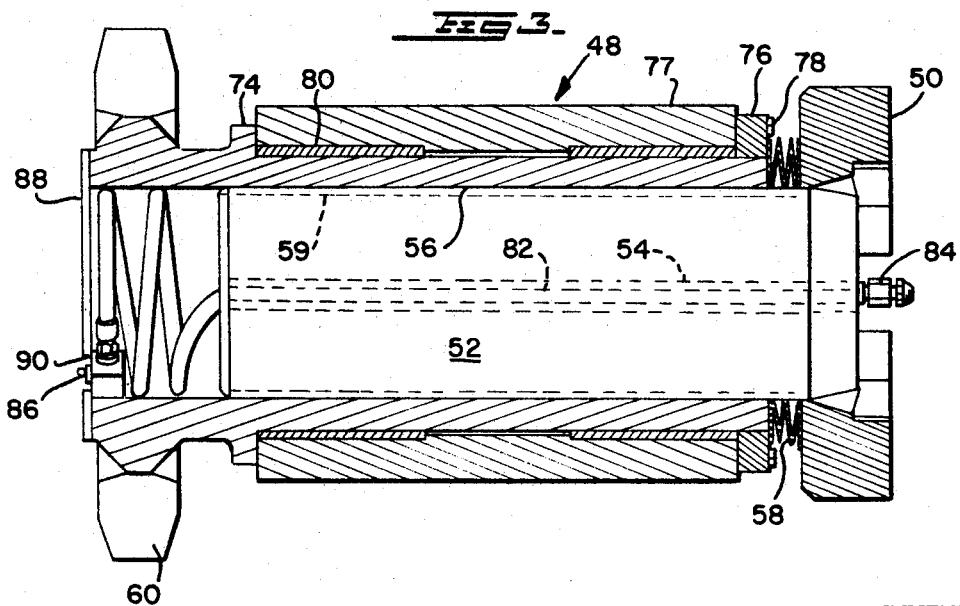
INVENTORS
PERCY R. HELM
CARL O. LEWIS

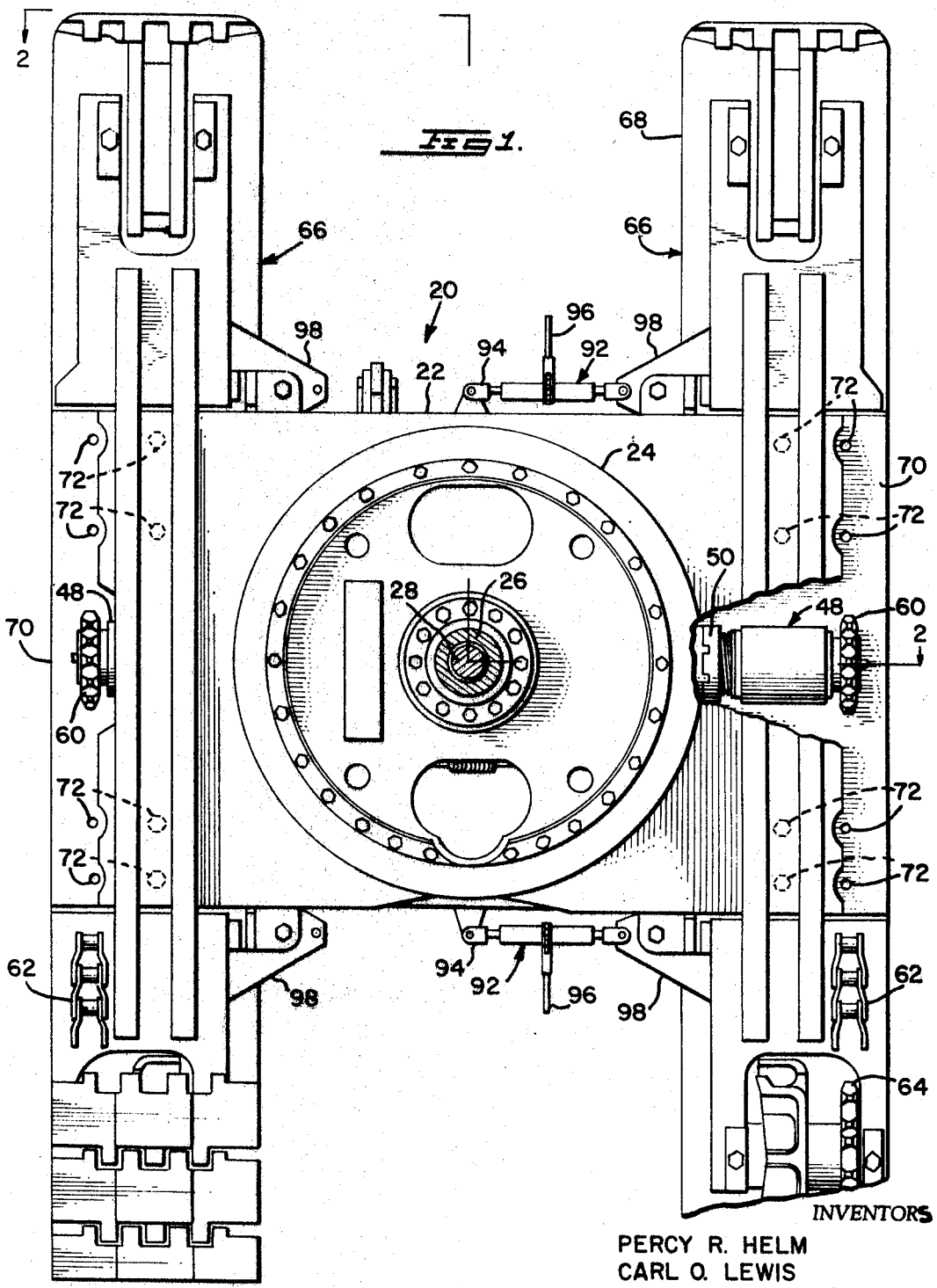

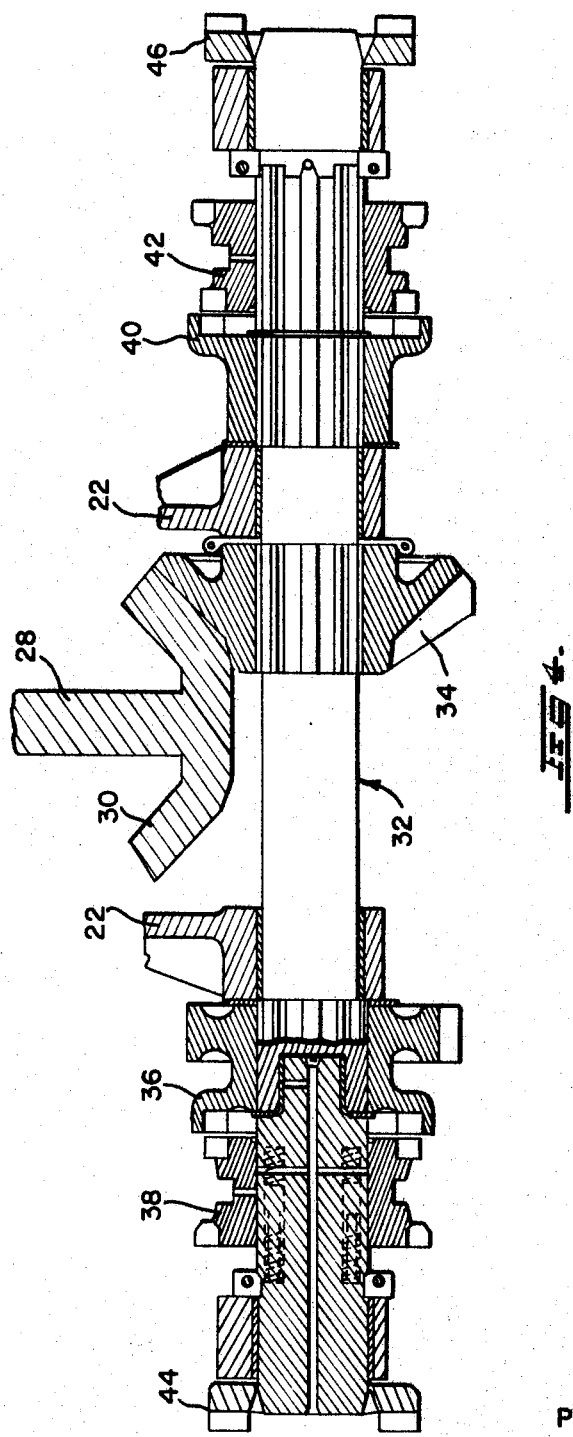

July 23, 1968 P. R. HELM ET AL 3,393,758
APPARATUS FOR STABILIZING A CRAWLER CRANE
Original Filed Sept. 30, 1963 4 Sheets-Sheet 4

INVENTORS
PERCY R. HELM
BY CARL O. LEWIS
ATTORNEY

United States Patent Office 3,393,758
Patented July 23, 1968

---

3,393,758
APPARATUS FOR STABILIZING A CRAWLER CRANE
Percy R. Helm and Carl O. Lewis, Manitowoc, Wis., assignors to the Manitowoc Company Inc., Manitowoc, Wis., a corporation of Wisconsin
Continuation of application Ser. No. 312,413, Sept. 30, 1963. This application Feb. 20, 1967, Ser. No. 629,050
11 Claims. (Cl. 180—6.7)

ABSTRACT OF THE DISCLOSURE

The invention resides broadly in a means to facilitate the widening of the distance between the crawler frames of an idustrial type crawler vehicle. The lower works of the vehicle is rigidly constructed and includes a laterally extending flat bottomed supporting plate directly slidably supported by a complementarily configured member on the crawler frame. Suitable releasable fasteners, such as nuts and bolts, secure the supporting plate of the lower works to the crawler frame in one of a plurality of positions. After the lower works has been disconnected from the crawler frame, the widening or narrowing of the distance between the crawler frames may be accomplished either by the use of manual force supplying means, hydraulic force applying means or by driving one crawler with respect to the other. Another facet of the invention resides in a telescoping drive connection between the lower works and the crawlers to provide for the driving of the crawler tracks for propelling the vehicle and for adjusting the distance between the crawler frames.

---

Cross references to related applications

The instant application is a continuation of Ser. No. 312,413, filed Sept. 30, 1963, now abandoned.

Background of the invention

The present invention relates, generally, to an apparatus for stabilizing vehicles of the industrial type by adjusting the thread width thereof.

More particularly, this invention pertains to an apparatus for stabilizing self-propelled vehicles of the industrial type, for example, crawler cranes, tractors and the like, by adjusting the distance between the treads thereof.

Heretofore, it has been suggested that vehicles of the industrial type, for example, crawler cranes, tractors and the like, be provided with a mechanism for adjusting the tread thereof, that is, a mechanism for increasing or decreasing the transverse dimensional extent for width of the vehicle, or the distance between the crawler assemblies. Most of the prior art devices suggest utilizing telescoping axle-type mechanisms which are extremely complex, bulky, and difficult to operate thus consuming excessive amounts of time and often requiring repair.

Additionally, heretofore suggested mechanisms for adjusting the tread of vehicles of the industrial type required the use of additional elements, thus presenting a vehicle having a lower works comprised of a plurality of separate component parts. As a result, existing vehicles are not of a unitary or rigid body construction. For example, it has been suggested that a spacer or axle section be positioned between the car body of a crawler crane and the crawler assemblies thereof to allow increasing the tread width thereof and stabilizing the vehicle. When it is desired to decrease the tread, the spacers or axle sections are removed. The car body of such vehicles is, therefore, a separate component part relative to the crawler assemblies, and the lower works, comprising the car body and the crawler assemblies, is not of a unitary or rigid construction.

Accordingly, with the above disadvantages in mind, it is a primary object of the present invention to provide an apparatus for stabilizing vehicles of the industrial type, such as crawler cranes, tractors and the like, by adjusting the tread thereof, that is, increasing or decreasing the transverse dimensional extent or width of the vehicle, with the distance between the crawler assemblies thereof, while simultaneously presenting a lower works, comprising at least in part, a car body and the crawler assemblies, of a unitary or rigid construction.

Another primary object of the invention is to provide an apparatus for stabilizing self-propelled vehicles of the industrial type by selectively adjusting the tread thereof, that is, increasing or decreasing the transverse dimensional extent or width of the vehicle, or the distance between the crawler assemblies thereof, while simultaneously presenting a lower works comprising at least in part, a car body and the crawler assemblies, of a unitary and rigid construction.

A further primary object of the present invention is to provide an apparatus for stabilizing self-propelled vehicles of the industrial type, for example, crawler cranes, tractors and the like, by adjusting the tread thereof while simultaneously presenting a lower works, comprising at least in part, a car body and the crawler assemblies, of a unitary or rigid construction, the increase or decrease in tread being unusually readily accomplished by steering the vehicle by the driving thereof.

A still further primary object of this invention is to provide an apparatus for stabilizing self-propelled vehicles of the industrial type, for example, crawler cranes, tractors and the like, by unusually efficiently mechanically or hydraulically adjusting the tread thereof.

Other objects and important features of the invention will be apparent from a study of the specification following taken with the drawing, which together show, illustrate, describe and disclose a preferred embodiment of a modification of the invention and what is now considered to be the best mode of practicing the principles, thereof. Other embodiments or modifications may be suggested to those having the benefit of the teachings herein, and such other embodiments or modifications are intended to be reserved especially if they fall within the scope and spirit of the subjoined claims.

Brief description of the drawing

FIGURE 1 is a plan view of a crawler crane, illustrating certain assemblies and component parts for adjusting the tread thereof in accordance with the present invention;

FIGURE 2 is a partial cross sectional view of the crawler crane of FIGURE 1 taken substantially along line 2—2 thereof as viewed in the direction indicated by the arrows, the leftmost crawler frame of FIGURE 1 being omitted for purposes of illustration;

FIGURE 3 is an enlarged view of a part of the telescoping drive connection illustrated in FIGURE 2;

FIGURE 4 is another enlarged view of a part of the drive assembly of the instant invention;

*Description of the preferred embodiment*

Figure 5:
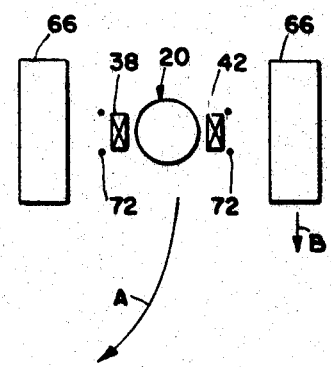
FIGURE 5 is a schematic view of the crawler crane shown in FIGURE 1 and illustrating a first position in the sequence of adjusting the tread thereof by steering by driving.

Attention is directed to FIGURE 1 wherein there is illustrated a lower works 20 of, for example, a crawler crane, which may be of any conventional type. The lower works 20 comprises a car body 22 having positioned thereon in any suitable manner a ring gear assembly 24, the same being structurally operatively associated, in use, with the conventional upper works (not shown) of the crane.

Extending generally vertically through the ring gear assembly 24 is a king pin and vertical travel shaft assembly 26. The vertical travel shaft assembly is centrally bored, and a travel drive pinion gear shaft 28 extends therethrough. Propelling of the lower works 20 can be effected in any suitable manner, and for example, can be driven with the drive pinion (not shown) of a gasoline engine, diesel engine or the like, in mesh with a driven pinion (not shown) operatively associated with or connected to the shaft 28. If desired, the king pin and vertical travel shaft assembly 26 and the travel drive pinion gear shaft 28 can be so constituted and arranged as to have certain fluid power operations, for example, power steering, effected by suitable controls in the upper works (not shown) of the crane.

Structurally operatively associated with or connected to the shaft 28 is a travel drive pinion gear 30. The pinion gear is mutually cooperatively engageable with, and affects the operation of, a horizontal travel shaft drive assembly 32 by mutual coopertaive engagement with the travel bevel gear 34 thereof. The travel shaft drive assembly 32 may be of any suitable conventional construction and is rotatably positioned relative to the car body 22 of the crane in any suitable manner. Generally, the assembly 32 comprises a left travel steering clutch jaw 36 that is mutually cooperatively engageable with a corresponding travel drive steering clutch 38 and a right travel steering clutch jaw 40 that is mutually cooperatively engageable with a corresponding travel drive steering clutch 42. The steering clutches 38 and 42 are shown, in FIGURE 4, in a neutral position. It is to be understood that each clutch normally is engaged, that is, positioned inwardly of the position illustrated in that figure, and that either one, but not both, can be moved to the neutral position illustrated therein at any one time. When one of the clutches 38 or 42 is disengaged, or in the neutral position as illustrated in FIGURE 4, a gradual turn about the disengaged clutch can be effected. This will be more fully described hereinafter.

Further, the travel shaft drive assembly 32 comprises a left travel or driving clutch 44 and a right travel or driving clutch 46. Each travel or driving clutch is mutually cooperatively engageable with a longitudinally adjustable telescoping assembly or connection 48, and, in particular, is mutually cooperatively engageable with the driven clutch 50 thereof. A clutch retainer 52, of any suitable construction, retains the driving clutch 44 and the driven clutch 50 in mutual cooperative engagement with one another. The clutches 44 and 50 may be disengaged by removing the clutch retainers 52 for purposes of removing a plurality of crawler assemblies, to be more fully described hereinafter, from the lower works 20 when it is desired to ship the crane from one point of use to another.

With particular reference now to FIGURE 3, the longitudinally adjustable telescoping assembly or connection 48 comprises a generally cylindrically configured solid shaft 52 integrally structurally cooperatively associated with or connected to the clutch 50. The shaft 52 has a bore 54 extending completely longitudinally therethrough and disposed generally centrally thereof, for a purpose to be described more fully hereinafter. The shaft 52, further, is longitudinally slidable of and relative to a generally cylindrically configured tubular sleeve 56. To insure smooth relative longitudinal reciprocal movements of the shaft 52 relative to the sleeve 56, a bellows 58 is structurally operatively associated therebetween or connected thereto, which bellows may be fabricated of any suitable material and in any suitable manner. Additionally, while the shaft 52 and the sleeve 56 are longitudinally reciprocally moveable relative to one another, it is desireable that relative rotation therebetween be precluded. To this end, there is provided the longitudinal splined connection 59 between the sleeve and the shaft.

A crawler tread driving sprocket 60 is fixedly positioned, in any suitable manner, upon and relative to the end of the sleeve 56 opposite the end thereof adjacent the clutch 50. The driving sprocket 60 is mutually cooperatively engageable with a crawler tread drive chain 62, particularly illustrated in FIGURE 1 which, in turn, is mutually cooperatively engageable with a crawler tread driven sprocket 64. The drive chain 62 and the driven sprocket 64 comprise, at least in part, a crawler assembly 66 and, in accordance with this construction, it can be seen that operation of the driving sprocket 60 causes operation of the chain 62 which, in turn, causes operation of the driven sprocket 64 and a crawler tread 68.

Each of the crawler assemblies 66 comprises, further, a crawler frame 70 constituting a flat load supporting plate. As illustrated in FIGURE 2 of the drawing, the car body 22 of the lower works 20 has on each side thereof generally laterally outwardly extending portions wings 71 to which there is secured a support structure in the form of plate like member 73 that extends along the outer limits of the car body 22 with the plate like members 73 being in load supporting relation to the respective crawler frame 70 of the crawler assemblies 66.

The plate like members 73 are of sufficient lateral extent to define a substantially flat or a planar surface 75 for enabling the crawler frames 70 to be laterally shifted or moved within designated limitations while the car body 22 is resting thereon with the plate like members 73 and the crawler frames 70 being in contact with each other so that there is a rigid construction in existence while the crawler assemblies 66 are being laterally positioned relative to the car body 22.

The crawler frames 70 of the crawler assemblies 66 are each structurally operatively associated with or connected to the car body 22 by a plurality of removable or disengageable crawler frame butt and tie bolt assemblies 72, disposed in a plurality of rows transversely of the lower works 20. Each of the assemblies 72 may comprise, for example, a plurality of apertures in each of the car body 22 and the crawler frames 70 which apertures are capable of being vertically aligned relative to one another. A bolt of any suitable construction, positionable within the vertically aligned apertures, acts to maintain the crawler assemblies 66 in the crawler frames 70 in a selected one of a plurality of positions laterally of and relative to the car body 22 thereby enabling the tread of the lower works 20 of the crane to be adjusted. As illustrated in FIGURE 1, the lower works 20 is provided with a pair of rows of assemblies 72 associated with each of the crawler frames 66 to provide two lateral positions for each crawler frame 66 relative to the car body 22. It is to be understood, however, that the assemblies of 72 may take any suitable form, keeping in mind the requirement that they be readily removable or disengageable, in any suitable manner, for adjusting the tread of the lower works.

With particular reference again to FIGURE 3, each of the longitudinally adjustable telescoping connections or assemblies 48 are structurally operatively associated with or connected to a portion 77 of a corresponding one of the crawler frames 70 in any suitable manner, as by providing the sleeve 56 wtih an integral collar 74 and another collar 76 fixedly associated with the sleeve 56, as by press-fitting the same relative thereto. The collar 76 is fixedly positioned in abutting relationship relative to the frame 70, for example, by a conventional fastener 78, thus precluding relative longitudinal movement between the frame 70 and the sleeve 56. Suitable bearings or bushings 80 are disposed between the frame 70 and the sleeve 56.

A grease line 82, of any suitable configuration, is positioned within each of the connections or assemblies 48, and, in particular, is disposed to extend through the bore 54 thereof. The grease lines 82 comprise a suitable fitting 84 for connection to a suitable source of lubricant supply (not shown), and an outlet fitting 86, of any suitable construction, for supplying lubricant to each of the crawler assemblies 66. A cover plate 88 is fixedly positioned upon that end of the sleeve 56 adjacent the driving sprocket 60, for closing that end of the sleeve, which cover plate is provided with an aperture 90 cooperating with the outlet fitting 86.

From the above, it can be seen that each of the crawler assemblies 66 are moveable laterally outwardly of and relative to the car body 22 of the lower works 20. This is especially true in view of the longitudinal reciprocally moveable relationship between the sleeve 56 and shaft 52 of each of the assemblies or connections 48.

Lateral movement of each of the crawler assemblies 66 outwardly and inwardly of and relative to the car body 22 may be accomplished manually, and, to this end, the lower works 20 may be provided with a plurality of manually operable ratchet jacks 92, pivotally connected to the car body 22 at pivot locations 94, and provided with a suitable handle 96. Each of the ratchet jacks or devices 92 are connectable to another portion 98 of each of the crawler frames 70. Thus, once one of the crawler assemblies 66 has been adjusted laterally of the car body 22, and it is desired to adjust the other assembly laterally of the body, the jacks or jack devices 92 are pivoted 180 degrees about their respective pivot points 94 and connected to the portions 98 of the frame 70 of the said other assembly 66. In addition, it is to be understood that the jacks or jack devices may be hydraulically operable, as well as manually operable, and, therefore, the drawings are to be construed and interpreted as illustrating jacks or jack devices that are manually as well as hydraulically operable. In the latter instance, suitable fluid supply connections from the upper works (not shown) of the crane would be provided to supply fluid to and exhaust fluid from each of the jacks or jack devices 92.

It will be noted that when the jacks 92, be they manually or hydraulically operable, are caused to adjust either one or both of the assemblies 66 laterally of the car body 22, the removeable crawler frame nut and tie bolt assemblies 72 must first be removed or disengaged. Subsequently, when the crawler assemblies have been laterally adjusted as desired, the assemblies 72 are once again disposed in place or engaged, to preclude undesired lateral movements of the crawlers relative to the car body 22.

Moreover, it will be understood that the lower works 20, comprising, at least in part, the car body 20 and the car assemblies 66, present a unitary or rigid construction, due to the cooperation between the crawler frames 70 and the supporting plate 73 in conjunction with the telescoping drive assemblies 48.

It will be further understood that a particular method for automatically adjusting the tread of the crawler assemblies 66, that is, increasing or decreasing the transverse dimensional extent or the width therebetween by steering by driving, has been developed, in accordance with the present invention. In this connection, reference is now made to FIGURES 5 through 7, wherein there is schematically illustrated the steps necessary to increase the tread of the crawler assemblies 66, and to FIGURES 8 through 10, wherein there is schematically illustrated the steps necessary to decrease the tread thereof.

Figure 6:
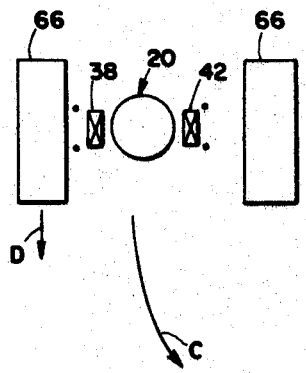
FIGURE 6 is a view similar to FIGURE 5 illustrating another or intermediate position in the sequence of adjusting the tread.
Figure 7:
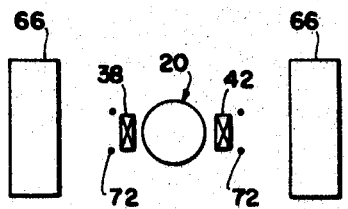
FIGURE 7 is a view similar to FIGURES 5 and 6, illustrating still another or final position in the sequence of adjusting the tread, in which position the extent of the tread is a maximum.

With reference now to FIGURES 5 through 7, and first to FIGURE 5, the tread of the crawler assemblies 66 is illustrated as being at a minimum. Thus, the outermost aperture of the assemblies 72 on the crawler frames 70 is vertically aligned with the aperture through the plate-like member 73 of the car body 22. To increase the tread of the crawler assemblies 66, the steering clutch 38 is disengaged so that the crawler assembly 66 controlled thereby idles. In addition, the assemblies 72 corresponding to the other crawler 66 are disengaged. The lower works 20 is now driven to the position of FIGURE 6. In so doing, since the crawler 66 controlled by the clutch 38 is idling, the lower works 20 will pivot thereabout, as indicated by the arrow A. However, since the assemblies 72 corresponding to the other crawler 66 have been disengaged, that crawler will tend to move straight ahead, and outwardly of and relative to the car body 22, as indicated by the arrow B. It will thus be apparent that the connection between the car body 22 and the crawler assembly 72 allows relative angular movement therebetween. When the lower works 20 has reached the position of FIGURE 6, it can be seen that the right crawler 66, as viewed in that figure, will automatically have been adjusted laterally outwardly of the lower works, this adjustment being facilitated by the longitudinally adjustable telescoping assembly 48 (not shown in these schematic illustrations). At this time, the asesmblies 72 corresponding to the right crawler 66 are again engaged.

To adjust the left crawler 66, as viewed in FIGURE 6, laterally outwardly of the lower works 20, the steering clutch 42 is disengaged and the assemblies 72 corresponding to the left crawler 66 disengaged. Disengagement of the clutch 42 renders the right crawler idling, enabling the lower works 20 to pivot thereabout when the same is driven, as indicated by the arrow C, to the position of FIGURE 7. However, since the assemblies 72 corresponding to the left crawler have been disengaged, that crawler will tend to move straight ahead, and outwardly of and relative to the car body 22, as indicated by the arrow D, to the position of FIGURE 7. Once the lower works 20 has reached the position of that figure, it can be been that the left crawler 66, as well, as illustrated therein, has been adjusted laterally outwardly of the lower works, at which time, the assemblies 72 corresponding thereto are once again engaged.

Figure 10:
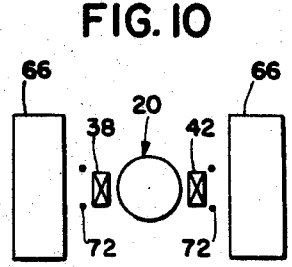
FIGURE 10 is a view similar to FIGURES 8 and 9, illustrating that position in the sequence in which the tread has been returned to the position of FIGURE 5.
Figure 9:
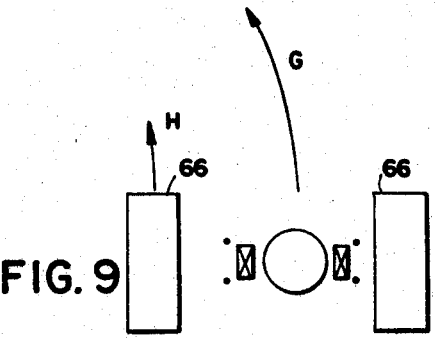
FIGURE 9 is a view similar to FIGURE 8, illustrating another or intermediate position in the sequence of readjusting the tread to the position of FIGURE 5.
Figure 8:
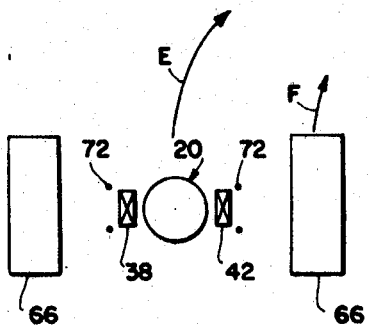
FIGURE 8 is a view similar to FIGURE 7, illustrating a first position in the sequence of readjusting the tread to the position of FIGURE 5.

To adjust the tread of the crawlers 66 laterally inwardly of the lower works 20, the procedure is substantially the same as that above, with but one exception. In the above procedure, the assemblies 72 opposite the disengaged steering clutch are disengaged. To adjust the tread laterally inwardly, the assemblies 72 on the same side as the disengaged steering clutch are disengaged. With reference now to FIGURES 8 through 10, and first to FIGURE 8, to adjust the right crawler assembly laterally inwardly, as viewed in that figure the steering clutch 42 and the assemblies 72 adjacent thereto are disengaged. The lower works 20 is now driven to the position of FIGURE 9. Disengagement of the clutch 42 affects idling of the right crawler 66, so that the lower works 20 pivots about the right crawler, as indicated by the arrow E. The right crawler also pivots, but to a lesser degree, as indicated by the arrow F. As a result, the right crawler is adjusted laterally inwardly, as facilitated by a corresponding one of the telescoping assemblies 48 (not shown in these schematic illustrations). The assemblies 72 controlling the right crawler 66 and the clutch 42 are now once again engaged.

Adjusting the left crawler 66, as viewed in the drawings, laterally inwardly, involves the same procedure as just described, with the exception that the steering clutch 38 and the adjacent assemblies 72 are now disengaged. As a result, the lower works 20 pivots about the left crawler 66, as indicated by the arrow G, and, while the left crawler also pivots, it does so to a lesser extent, as indicated by the arrow H. Having now moved to the position of FIGURE 10, in which both crawlers 66 have been adjusted laterally inwardly, as facilitated by the telescoping assemblies 48, the clutch 38 and the corresponding assemblies 72 are again engaged.

While the invention has been shown, illustrated, described and disclosed in terms of an embodiment or modification which it has assumed in practice, the scope of the invention should not be deemed to be limited by the precise embodiment or modification herein shown, illustrated, described, or disclosed, such other embodiments or modifications intended to be reserved especially as they fall within the scope of the claims here appended.

What we claim as our invention is:

1. A rigid lower works of a mobile type crawler crane comprising, in combination:
   a car body;
   a plurality of crawler assemblies, each of said crawler assemblies comprising,
   a crawler tread driving chain, and
   a crawler tread driven sprocket mutually cooperatively engageable with said driving chain;
   a horizontal travel shaft drive assembly for causing the driving of each of said crawler assemblies, said drive assembly comprising,
   a plurality of steering clutches;
   one each of said steering clutches being disposed for causing directional movement of a corresponding one of said crawler assemblies, and being so constituted and arranged as to be disengageable to affect the idling of said crawler assemblies; and
   a plurality of driving clutches;
   one each of said driving clutches being disposed for causing the driving of said driving chain;
   a plurality of longitudinally adjustable telescoping connections positioned, one each, between one of said driving clutches and a corresponding one of said crawler assemblies for rendering said lower works of a rigid construction, and for rendering said crawler assemblies laterally adjustable relative to said car body, each of said adjustable connections comprising,
   a generally cylindrically configured solid shaft having:
   a generally centrally disposed bore extending therethrough,
   a driven clutch integrally structurally operatively associated with said shaft,
   a generally cylindrically configured tubular sleeve disposed about said shaft;
   said shaft and said tubular sleeve being longitudinally slidable relative to one another;
   said tubular sleeve being structurally operatively associated with a corresponding one of said crawler assemblies;
   the driven clutch of each of said adjustable connections being mutually cooperatively engageable with a corresponding one of the driving clutches of said travel drive assembly,
   a crawler tread driving sprocket fixedly positioned upon and relative to said tubular sleeve,
   said crawler tread driving sprocket being mutually cooperatively engageable with a corresponding one of said crawler tread driving chains;
   a bellows disposed between said sleeve and said shaft to insure smooth relative longitudinal reciprocations of one relative to the other,
   a grease line extending through the bore of said shaft for supplying a lubricant to each of said crawler assemblies, and
   a splined connection between said shaft and said sleeve for enabling relative longitudinal reciprocations of one relative to the other while precluding relative rotational movements therebetween;
   a plurality of jack devices for adjusting each of said crawler assemblies laterally of said car body;
   each of said jack devices being pivotable about a pivot point for selective lateral adjustment of a corresponding one of said crawler assemblies; and
   a plurality of disengageable assemblies for maintaining each of said crawler assemblies selectively in each of a plurality of positions laterally of and relative to said car body.

2. A rigid lower works of a mobile type crawler crane comprising, in combination:
   a car body;
   a plurality of crawler assemblies, each of said crawler assemblies comprising:
   a crawler tread driving chain, and
   a crawler tread driven sprocket mutually cooperatively engageable with said driving chain;
   a horizontal travel shaft drive assembly for causing the driving of each of said crawler assemblies, said drive assemblies comprising:
   a plurality of steering clutches;
   one each of said steering clutches being disposed for causing directional movement of a corresponding one of said crawler assemblies, and being so constituted and arranged as to be disengageable to effect the idling of said crawler assemblies; and
   a plurality of driving clutches;
   one each of said driving clutches being disposed for causing the driving of said driving chain;
   a plurality of longitudinally adjustable telescoping connections positioned, one each, between one of said driving clutches and a corresponding one of said crawler assemblies for rendering said lower works of a rigid construction, and for rendering said crawler assemblies laterally adjustable relative to said car body, each of said adjustable connections comprising:
   a generally cylindrically configured solid shaft having:
   a generally centrally disposed bore extending therethrough,
   a driven clutch integrally structurally operatively associated with said shaft,
   a generally cylindrically configured tubular sleeve disposed about said shaft;
   said shaft and said tubular sleeve being longitudinally slidable relative to one another;
   said tubular sleeve being structurally operatively associated with a corresponding one of said crawler assemblies;
   the driven clutch of each of said adjustable connections being mutually cooperatively engageable with a corresponding one of the driving clutches of said travel drive assembly,
   a crawler tread driving sprocket fixedly positioned upon and relative to said tubular sleeve,
   said crawler tread driving sprocket being mutually cooperatively engageable with a corresponding one of said crawler tread driving chains;
   a splined connection between said shaft and said sleeve for enabling relative longitudinal reciprocations of one relative to the other while precluding relative rotational movements therebetween; and
   a plurality of disengageable assemblies for maintaining each of said crawler assemblies selectively in each of a plurality of positions laterally of and relative to said car body.

3. The apparatus as set forth in claim 2 further comprising:
   a bellows disposed between said sleeve and said shaft to insure smooth relative longitudinal reciprocations of one relative to the other.

4. The apparatus as set forth in claim 2 further comprising:
   a grease line extending through the bore of said shaft for supplying a lubricant to each of said crawler asemblies.

5. The apparatus as set forth in claim 2 further comprising:
a plurality of jack devices for adjusting each of said crawler assemblies laterally of said car body;
each of said jack devices being pivotable about a pivot point for selective lateral adjustment of a corresponding one of said crawler assemblies.

6. A vehicle comprising:
a lower works having a car body;
a crawler assembly positioned adjacent at least one side of the car body, the crawler assembly having;
a crawler frame having plate means thereon for supporting the car body; and
structure for enabling the crawler assembly to be laterally positioned relative to the car body to adjust the tread of the vehicle, the structure comprising
generally laterally outwardly projecting means on the car body presenting a generally flat lower surface supported by the plate means of the crawler frame for enabling the crawler assembly to undergo relative angular movement with respect to the car body;
means for connecting the crawler frame to the projecting plate means at laterally spaced locations thereon; and
an adjustable drive connection extending between the car body and the crawler assembly for enabling power to be transmitted to the crawler assembly when the crawler frame is disposed in the lateral positions.

7. The vehicle of claims 6 wherein the adjustable drive connection comprises
a driving member on the car body;
a driven member carried by the crawler assembly; and
means telescopingly mounting the driving and driven members for transmitting power therebetween.

8. The vehicle of claim 6 further comprising
extensible means connected between the car body and the crawler assembly for adjusting the position of the crawler assembly with respect to the car body.

9. A vehicle comprising
a lower works having
a car body comprising wings extending laterally from both side of the car body, the wings presenting a generally flat lower surface;
a crawler assembly positioned on each side of the car body, each of the crawler asemblies having
a crawler frame comprising plate means supporting the lower surface of the wings for enabling the crawler assembly to be adjusted to undergo slight relative angular movement with respect to the car body;
means for connecting the crawler frames to the wings at laterally spaced locations thereon; and
an adjustable drive connection extending between the car body and the crawler assemblies for enabling power to be transmitted to the crawler assemblies when the crawler frames are disposed in the lateral positions.

10. The vehicle of claim 9 further comprising
extensible means connected between the car body and the crawler assembly for adjusting the position of the crawler assembly with respect to the car body.

11. The vehicle of claim 9 wherein the adjustable drive connection comprises
a driving member on the car body;
a driven member carried by the crawler assembly; and
means telescopingly mounting the driving and driven members for transmitting power therebetween.

References Cited
UNITED STATES PATENTS

| | | | |
|---|---|---|---|
| 2,296,659 | 9/1942 | Bates et al. | |
| 2,681,231 | 6/1954 | Kondracki | 301—128 |
| 2,763,330 | 7/1956 | Potter | 180—9.48 |
| 3,037,571 | 6/1962 | Zelle | 180—9.48 |
| 3,205,961 | 9/1965 | Nolte | 180—9.48 |

BENJAMIN HERSH, *Primary Examiner.*

J. A. PEKAR, *Assistant Examiner.*